United States Patent
Lee et al.

(10) Patent No.: US 9,756,535 B2
(45) Date of Patent: Sep. 5, 2017

(54) TERMINAL FOR A CONTENT CENTRIC NETWORK AND METHOD OF COMMUNICATION FOR A TERMINAL AND A HUB IN A CONTENT CENTRIC NETWORK

(75) Inventors: Ji Hoon Lee, Anyang-si (KR); Myeong Wuk Jang, Seoul (KR); Jae Hoon Kim, Yongin-si (KR); Do Jun Byun, Goyang-si (KR); Joong Hong Park, Seoul (KR); Sung Chan Choi, Euijeongbu-si (KR)

(73) Assignee: Samsung Electronis Co., Ltd., Suwon-si (KR)

( * ) Notice: Subject to any disclaimer, the term of this patent is extended or adjusted under 35 U.S.C. 154(b) by 873 days.

(21) Appl. No.: 13/007,740

(22) Filed: Jan. 17, 2011

(65) Prior Publication Data
US 2011/0280214 A1    Nov. 17, 2011

(30) Foreign Application Priority Data

May 13, 2010   (KR) .................. 10-2010-0045032

(51) Int. Cl.
H04W 36/08 (2009.01)
H04W 36/02 (2009.01)
H04L 29/08 (2006.01)

(52) U.S. Cl.
CPC ......... *H04W 36/023* (2013.01); *H04L 67/327* (2013.01); *H04L 67/2842* (2013.01)

(58) Field of Classification Search
CPC . H04W 36/18; H04W 36/0011; H04W 36/14; H04W 36/08; H04W 80/04
See application file for complete search history.

(56) References Cited

U.S. PATENT DOCUMENTS

| 5,684,714 A * | 11/1997 | Yogeshwar .......... G11B 27/031 370/521 |
| 5,896,373 A * | 4/1999 | Mitts et al. .................. 370/331 |
| 6,317,718 B1 * | 11/2001 | Fano ......................... 705/14.39 |
| 6,356,905 B1 * | 3/2002 | Gershman et al. .......... 705/26.8 |

(Continued)

FOREIGN PATENT DOCUMENTS

| CN | 1243370 A | 2/2000 |
| EP | 2 120 402 A1 | 11/2009 |

(Continued)

OTHER PUBLICATIONS

Japanese Office Action issued by the Japanese Patent Office on Aug. 12, 2014 for the corresponding Japanese Application No. 2011-105039. (4 pages and an English Translation).

(Continued)

*Primary Examiner* — Robert C Scheibel
*Assistant Examiner* — Prenell Jones
(74) *Attorney, Agent, or Firm* — NSIP Law

(57) ABSTRACT

A method of communication for a terminal in a content-centric network is provided. The method includes suspending a data message associated with a content from being provided to a face before a handover when the handover is expected to occur in the terminal that requests the content, and transmitting, to a hub, a new interest message after the handover associated with the content so that the hub may provide the data message associated with the content to the face after the handover.

19 Claims, 10 Drawing Sheets

(56) References Cited

U.S. PATENT DOCUMENTS

| | | | |
|---|---|---|---|
| 6,542,740 B1* | 4/2003 | Olgaard et al. | 455/432.1 |
| 6,826,613 B1* | 11/2004 | Wang et al. | 709/227 |
| 6,845,370 B2* | 1/2005 | Burkey et al. | 707/749 |
| 6,865,169 B1* | 3/2005 | Quayle et al. | 370/335 |
| 6,892,196 B1* | 5/2005 | Hughes | 707/754 |
| 7,242,988 B1* | 7/2007 | Hoffberg et al. | 700/28 |
| 7,356,567 B2* | 4/2008 | Odell et al. | 709/206 |
| 7,512,099 B2* | 3/2009 | Ameigeiras et al. | 370/331 |
| 7,539,191 B1* | 5/2009 | Jacobson et al. | 370/392 |
| 7,730,188 B1* | 6/2010 | Amick et al. | 709/227 |
| 8,001,476 B2* | 8/2011 | Gallo | 715/742 |
| 8,041,335 B2* | 10/2011 | Khetawat et al. | 455/404.2 |
| 8,068,460 B2* | 11/2011 | Fajardo et al. | 370/331 |
| 8,121,891 B2* | 2/2012 | Handel et al. | 705/14.26 |
| 8,761,117 B2* | 6/2014 | Falconetti et al. | 370/330 |
| 8,792,448 B2* | 7/2014 | Nix | 370/329 |
| 8,885,600 B2* | 11/2014 | Lee et al. | 370/331 |
| 2002/0031144 A1* | 3/2002 | Barton | 370/468 |
| 2002/0126633 A1* | 9/2002 | Mizutani et al. | 370/329 |
| 2002/0191562 A1* | 12/2002 | Kumaki et al. | 370/331 |
| 2003/0036408 A1* | 2/2003 | Johansson et al. | 455/560 |
| 2004/0009751 A1* | 1/2004 | Michaelis et al. | 455/62 |
| 2004/0062214 A1* | 4/2004 | Schnack et al. | 370/315 |
| 2005/0204058 A1* | 9/2005 | Philbrick et al. | 709/238 |
| 2007/0011148 A1* | 1/2007 | Burkey et al. | 707/3 |
| 2009/0043621 A1* | 2/2009 | Kershaw | 705/7 |
| 2009/0092084 A1* | 4/2009 | Kim et al. | 370/329 |
| 2009/0170517 A1* | 7/2009 | Karlsson et al. | 455/436 |
| 2009/0259778 A1* | 10/2009 | Burge | 710/62 |
| 2010/0159944 A1* | 6/2010 | Pascal et al. | 455/456.1 |
| 2010/0183006 A1* | 7/2010 | Iwai et al. | 370/389 |
| 2010/0195655 A1* | 8/2010 | Jacobson et al. | 370/392 |
| 2010/0208706 A1* | 8/2010 | Hirano et al. | 370/332 |
| 2010/0306443 A1* | 12/2010 | Lin et al. | 710/313 |
| 2011/0125585 A1* | 5/2011 | Dow et al. | 705/14.66 |
| 2011/0211626 A1* | 9/2011 | Yen et al. | 375/224 |
| 2012/0083262 A1* | 4/2012 | Dimou et al. | 455/423 |
| 2012/0281683 A1* | 11/2012 | Falconetti et al. | 370/336 |
| 2014/0023045 A1* | 1/2014 | Li et al. | 370/331 |
| 2014/0057566 A1* | 2/2014 | Watfa et al. | 455/41.2 |

FOREIGN PATENT DOCUMENTS

| | | |
|---|---|---|
| JP | 2004-140525 A | 5/2004 |
| JP | 2007-166654 | 5/2007 |
| JP | 2010-178343 A | 8/2010 |
| KR | 10-2006-0134895 A | 12/2006 |
| KR | 10-2008-0025033 A | 3/2008 |
| KR | 10-2008-0078973 | 8/2008 |
| KR | 10-2009-0045369 | 5/2009 |
| KR | 10-2009-0065755 | 6/2009 |
| WO | WO 2007/123255 A1 | 11/2007 |
| WO | WO 2010/046178 A1 | 4/2010 |

OTHER PUBLICATIONS

Jacobson, Van, et al. "Networking named content." Proceedings of the 5th international conference on Emerging networking experiments and technologies. ACM, XP002608160 (Submitted: Oct. 13, 2009; Published: Dec. 1-4, 2009): 1-12. (13 pages with coversheet, in English).

Extended European Search Report mailed Nov. 26, 2014 in counterpart European Application No. 11154460.7 (10 pages, in English).

Chinese Office Action Issued by the Chinese Patent Office on Oct. 10, 2015 for corresponding Chinese Application No. 201110064195.2 (40 pages with English Translation).

Korean Office Action issued on Apr. 14, 2016, in counterpart Korean Application No. 10-2010-0045032. (17 pages with English translation).

* cited by examiner

TERMINAL FOR A CONTENT CENTRIC NETWORK AND METHOD OF COMMUNICATION FOR A TERMINAL AND A HUB IN A CONTENT CENTRIC NETWORK

CROSS-REFERENCE TO RELATED APPLICATION(S)

This application claims the benefit under 35 U.S.C. §119(a) of Korean Patent Application No. 10-2010-0045032, filed on May 13, 2010, in the Korean Intellectual Property Office, the entire disclosure of which is incorporated herein by reference for all purposes.

BACKGROUND

1. Field

The following description relates to a communication method of a terminal and a hub, and more particularly, to a communication method of a terminal and a hub in a content centric network, and a terminal for a content centric network.

2. Description of Related Art

While current Internet structures are configured based on a one-to-one communication paradigm in a host-to-host basis, a majority of actual Internet uses may have a data or a content centric aspect different from a host centric aspect. Users may be interested in data or content instead of who has the data they desire.

Due to the inconsistency between the Internet structure and actual usage patterns, redundant operations and procedures may occur when a user obtains desired data. For example, when the Internet is configured in a content centric paradigm, data or content may be more easily provided to the user.

SUMMARY

In one general aspect, there is provided a communication method of a terminal in a content-centric network, the method comprising sensing whether a handover occurs in the terminal that requests a content while the terminal is provided with a service, requesting a hub to perform a transmission interruption using an interest message before the handover associated with the content to suspend providing a face before the handover with a data message associated with the content, when the handover is expected to occur, and transmitting, to the hub, a new interest message after the handover associated with the content so that the hub provides a face after the handover with the data message associated with the content, when the handover is completed.

The sensing may comprise sensing whether the terminal is moving based on information about an underlying layer of a network interface, and determining whether the handover occurs in the terminal based on a change in an Internet protocol (IP) address of the terminal or a change in a prefix of a subnet of the terminal according to the move of the terminal.

The sensing may comprise receiving a polling result performed by the hub to sense whether the handover occurs in the terminal, and determining whether the handover occurs based on the polling result.

The new interest message may comprise new location information of the terminal as a result of the handover.

In another aspect, there is provided a method of communication for a hub in a content-centric network, the method comprising receiving, from a terminal, a request for a transmission interruption for an interest message before the handover associated with the content, when a handover occurs while the terminal that requests a content is provided with a service, suspending, according to the request, a transmission of a data message associated with the content recorded in a pending interest table that is used for routing, and associated with the interest message received from a face before the handover, storing, in a content cache, the data message associated with the content recorded in the pending interest table, and transmitting, to the terminal, the stored data message associated with the content, using a new interest message after the handover associated with the content received from the terminal, after the handover is completed.

In another aspect, there is provided a method of communication for a terminal in a content-centric network, the method comprising sensing whether a handover is completed, wherein the handover occurs while the terminal that requests content is provided with a service, and requesting a hub to perform an update on a new face after the handover so that the new face after the handover is provided with at least one data message associated with the content transmitted based on an interest message before the handover, after the handover is completed.

The requesting may comprise requesting that information of an incoming face field be modified to a new face after the handover, and the incoming face field indicates a face provided with at least one data message associated with the content from among fields of a pending interest table used for routing.

The requesting may further comprise requesting a transmission, to the face before the handover, of at least one data message associated with the content received by the interest message before the handover associated with the content to be stored in the hub.

The requesting the transmission may comprise requesting the transmission of the at least one data message associated with the content, by piggybacking a control message on the hub, the control message comprising a sequence information list indicating a sequence of the at least one data message associated with the content that is not received by the terminal, after the hub has transferred the at least one data message to the face before the handover.

The sequence information list may comprise at least one of sequence information of a first data message and sequence information of the last data message, from among at least one data message associated with the content that is not received by the terminal, after the hub has transferred the at least one data message to the terminal via the face before the handover.

In another aspect, there is provided a method of communication for a hub in a content-centric network, the method comprising receiving, from a terminal, a request for an update on a new face after a handover, to provide the new face after the handover with at least one data message associated with a content transmitted based on an interest message before the handover associated with the content, after the handover occurs, modifying incoming face field information to the new face after the handover, the incoming face field indicates a face provided with at least one data message associated with the content from among fields of a pending interest table used for a routing, based on the new face after the handover provided from the terminal, and transmitting, to the new face after the handover, at least one data message associated with the content.

The transmitting may further comprise transmitting, to the terminal via the new face after the handover, the at least one data message associated with the content received via the face before the handover to be stored, by the interest message.

The transmitting may comprise receiving, from the terminal, a control message comprising a sequence information list with respect to at least one data message associated with the content transmitted to the terminal via the face before the handover, and transmitting, to the new face after the handover, the at least one data message associated with the content, based on the sequence information list.

In another aspect, there is provided a computer-readable storage medium having stored therein program instructions to cause a processor to implement a communication method of a terminal in a content-centric network, the method comprising sensing whether a handover occurs in the terminal that requests a content while the terminal is provided with a service, requesting a hub to perform a transmission interruption using an interest message before the handover associated with the content to suspend providing a face before the handover with a data message associated with the content, when the handover is expected to occur, and transmitting, to the hub, a new interest message after the handover associated with the content so that the hub provides a face after the handover with the data message associated with the content, when the handover is completed.

In another aspect, there is provided a terminal for a content-centric network, the terminal comprising a sensor to sense whether a handover occurs in the terminal that requests a content while the terminal is being provided with a service, a requester to request a hub to perform a transmission interruption for an interest message before the handover associated with the content to suspend providing a face before the handover with a data message associated with the content, when the handover is expected to occur, and a message transmitter to transmit, to the hub, a new interest message after the handover associated with the content so that the hub provides a face after the handover with the data message associated with the content, when the handover is completed.

In another aspect, there is provided a terminal for a content-centric network, the terminal comprising a sensor to sense whether a handover is completed, the handover occurring while the terminal that requests a content is being provided with a service, an update requester to request a hub to perform an update on a new face after the handover so that the new face after the handover is provided with at least one data message associated with the content transmitted based on an interest message before the handover associated with the content, after the handover is completed, and a data requester to request a transmission of at least one data message associated with the content to the new face after the handover, by piggybacking a control message on the hub, wherein the control message comprises a sequence information list indicating a sequence of the at least one data message associated with the content that is not received by the terminal after the hub has transferred the at least one data message to the face before the handover.

In another aspect, there is provided a terminal in a content centric network that requests content from a hub, the terminal comprising a receiver configured to receive one or more data messages associated with the requested content from a first face of a hub, a sensor configured to sense whether a handover is about to occur in the terminal, a requester configured to request the hub to suspend transmission of the one or more data messages associated with the requested content using the first face, when the handover is expected to occur, and a message transmitter to transmit, to the hub, an interest message indicating that the handover is completed, when the handover is completed, wherein, after the terminal transmits the interest message, and after the handover is completed, the receiver receives remaining data messages associated with the requested content from a second face of the hub.

The terminal may further comprise an update requester configured to transmit a request to the hub to update a transmitting face from the first face to the second face.

The terminal may further comprise a control message generator configured to generate a control message that comprises a sequence list of one or more data messages of the content that were not successfully received by the terminal, and a data requester configured to transmit the control message to the second face of the hub to inform the hub of the data messages that were not successfully received.

In another aspect, there is provided a method of a terminal in a content-centric network, the method comprising requesting content from a hub, receiving one or more data messages associated with the requested content from a first face of the hub, sensing that the terminal is about to perform a handover, transmitting a request to the hub to request the hub to suspend transmission of the data messages associated with the content using the first face of the hub, performing the handover, transmitting a request to the hub to indicate that the handover has been successfully performed and to request receipt of the remaining data messages associated with the content, and receiving the remaining data messages associated with the content from a second face of the hub.

In another aspect, there is provided a method of a hub in a content-centric network, the method comprising receiving a request for content from a terminal, transmitting, via a first face of the hub to the terminal, one or more data messages associated with the requested content, receiving a request to suspend the transmission of a remaining amount of the one or more data messages before completion of transmitting the entire amount of the one or more data messages associated with the content, based on a handover that the terminal is about to perform, receiving a request from the terminal to resume transmission of the remaining data messages based on the completion of the handover, and transmitting, via a second face of the hub to the terminal, the remaining data messages associated with the content.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
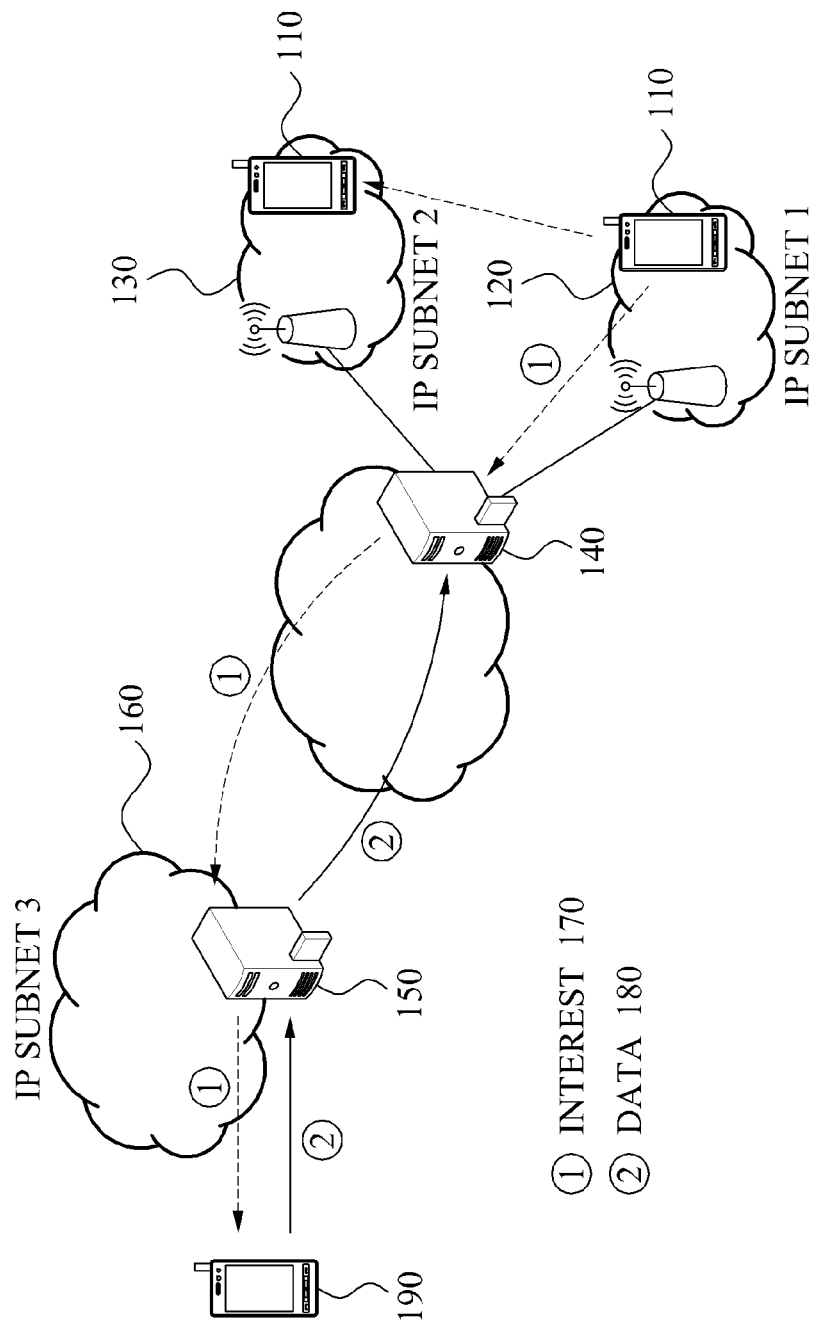
FIG. 1 is a diagram illustrating an example of a transmission path of a message when a handover occurs in a content centric network.

FIG. 1 illustrates an example of a transmission path of a message when a handover occurs in a content centric network.

Referring to the example of FIG. 1, the content centric network includes a terminal X 110 that requests content, a hub (1) 140 that manages the terminal X 110, a terminal Y 190 that has content, a hub (2) 150 that manages the terminal Y 190, and an IP subnet (1) 120, an IP subnet (2) 130, and an IP subnet (3) 160 to which the terminals belong, respectively.

The content centric network may be configured based on an environment in which individuals may configure and manage a content domain or a virtual group on a content centric network foundation.

In this example, the terminal X 110 is a terminal that belongs to the IP subnet (1) 120, is managed by the hub (1) 140, and requests content. In this example, the terminal Y 190 is a terminal that belongs to the IP subnet (3) 160, has content, and is managed by the hub (2) 150.

The terminal X 110 may request a transmission of a predetermined content by transmitting, to the hub (1) 140, an interest message or an interest packet 170 including the name of the desired content as a destination.

The hub (1) 140 that receives the interest message 170 may search for a terminal that has the content requested by the terminal X 110. For example, the interest message 170 may be transmitted to various network devices connected to a corresponding network. For example, the network devices may include various terminals, an access point, a hub, and the like.

The network device may have a content centric network engine, and the content centric network engine may be configured to adapt to a dichotomized transmission structure of an interest/data.

As an example, the hub (1) 140 may estimate or determine whether a routing list that corresponds to a content name included in the interest message 170 exists by searching a content routing table, for example, a pending interest table, including a content name as an indicator. The pending interest table is further described with reference to FIG. 2.

In this example, the terminal Y 190 that receives the interest message 170 using the pending interest table has the content list corresponding to the content name included in the interest message 170. Accordingly, the terminal X 110 may receive a data message 180 with respect to the predetermined content from the terminal Y 190.

For example, the predetermined content may be suitably segmented for a transmission unit and stored in the terminal Y 190, and each interest message 170 may induce a transmission of a predetermined segment of the desired content by including a corresponding segment number. As an example the data message 180 may be transferred by inversely using a path that the interest message 170 passed through.

The transmission of the interest message 170 from the terminal X 110 to the terminal Y 190 may be continuously performed until the transmission of all segments that configure the content requested by the terminal X 110 are completed.

Accordingly, when the terminal X 110 moves to the IP subnet (2) 130 while a content providing service is provided to the terminal X 110, the terminal X 110 may use a scheme of informing the hub (1) 140 of the handover in advance, or a scheme of informing the hub (1) 140 of a new location of the terminal X 110, for example, a face or a port, after the handover.

Various communication schemes of the terminal X 110 and the hub (1) 140 with respect to the handover of the terminal X 110 are further described hereinafter.

Figure 2:
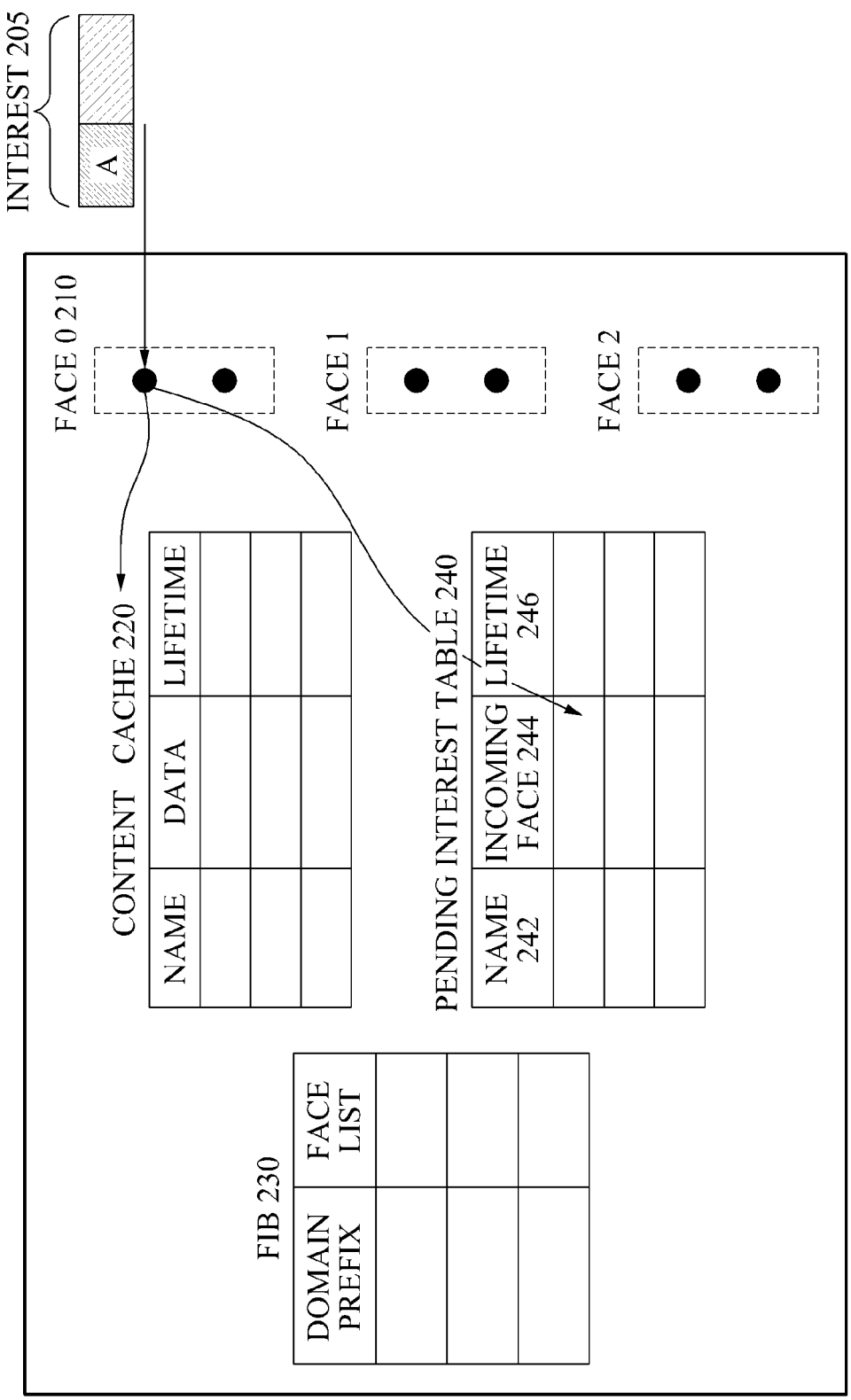
FIG. 2 is a diagram illustrating an example of processing an interest message by a hub in a module of a content centric network.

FIG. 2 illustrates an example of processing an interest message by a hub in a module of a content centric network.

Referring to FIG. 2, the module of the content centric network includes a content cache 220, a forwarding information base (FIB) 230, and a pending interest table (PIT) 240.

For example, the content cache 220 may store a name of the content, data, a lifetime, and the like, to verify the content included in a cache. The hub may look up the content cache 220 of the hub to verify whether the hub has the content indicated by an interest message. When the content is not found in the content cache 220, the FIB 230 may indicate a location where the interest message is forwarded. Thus, when the content is not found in the content cache 220, the hub may search the FIB 230 to determine where to forward the interest message.

The PIT 240 may store information that indicates that information about an interface has been exchanged with a corresponding interest file. For example, the PIT may store information about an interface received via the interest message and may use that information to transmit a data message. For example, the PIT 240 may include information associated with a routing for providing the content to a terminal.

In this example, the PIT 240 includes a name field 242, an incoming face field 244, and a lifetime field 246.

The name field 242 may include a name of the data message associated with the content to indicate that an interest message is associated with a particular content. For example, an interest message may be an interest file associated with a particular data message. Accordingly, an exchanged interest file may be verified based on information included in the name field 242.

The incoming face field 244 may indicate information about the interface via which the interest message is received.

For example, the information about the interface via which the interest message is received may indicate information about a face or a port via which the interest message is received, may indicate a face via which at least one data message associated with the content is provided, and the like.

The lifetime field 246 may include information about a period of time during which the data message associated with the corresponding content is maintained.

Hereinafter, an operation of processing the interest message using a module of the content centric network by the hub (1) 140 of the terminal X 110 is described with reference to FIG. 1 and FIG. 2.

For example, when terminal X 110 transmits the interest message 170 in the IP subnet (1) 120, the hub (1) 140 may search the content cache 220 of the hub (1) 140 to verify whether the hub (1) 140 includes a content A indicated by the interest message 170.

When the corresponding content is not found in the content cache 220, the hub (1) 140 may search a longest matching entry in the FIB 230, and may determine a next outgoing face using the longest matching entry to determine where to forward the interest packet.

In this example, the longest matching entry refers to an entry having the largest portion that matches a content name designated by the interest packet in an address system on a domain prefix, or content name basis stored in the FIB 230. The above operation scheme may be similar to a scheme used in IP routing. For example, when it is assumed that an IP routing addresses stored in the FIB 230 are '75.x.x.4', '75.2.x.7', and '75.2.67.11,' and a destination address is '75.2.67.4', the routing address '75.2.67.11' has the largest portion of three digits matching the '75.2.67.4'. Accordingly, the longest matching entry may be the '75.2.67.11' and thus, the possibility of finding the corresponding content in the vicinity of the '75.2.67.11' may be higher as compared to the routing addresses that are not the longest matching entry.

The hub (1) 140 may store, in the PIT 240, information about forwarding the interest message 170 to the next hop to forward the data message afterwards. The hub (1) 140 may find a transfer path of the received data message using the information of the PIT 240.

However, when the terminal X 110 moved to the IP subnet (2) 130, because the interest message 170 associated with the content is provided to the face before the handover, a value stored in the PIT 240 may not be deleted during a period of time designated by the lifetime field 246 of the PIT 240.

For example, the terminal X 110 may request the hub (1) 140 to suspend transmitting the interest message 170 associated with the content requested by the terminal X 110 before moving according to the handover.

Once the handover is completed, the terminal X 110 may request the hub (1) 140 to modify a value of the PIT 240 that is recorded according to the interest message 170 associated with the content and that was recorded before the handover. Accordingly, the value of the PIT 240 may be modified from the face before the handover to the face after the handover.

Accordingly, data messages associated with the content requested by the terminal X 110 may be transferred to the hub (1) 140 via a face after the handover is performed.

For example, before the handover is performed, the hub may use face 0 210 to transmit content to the terminal. After the terminal performs the handover, the new face that the hub provides the terminal with content may be face 1 or face 2.

A method of communication for the terminal X 110 and the hub (1) 140 is further described hereinafter.

Figure 3:
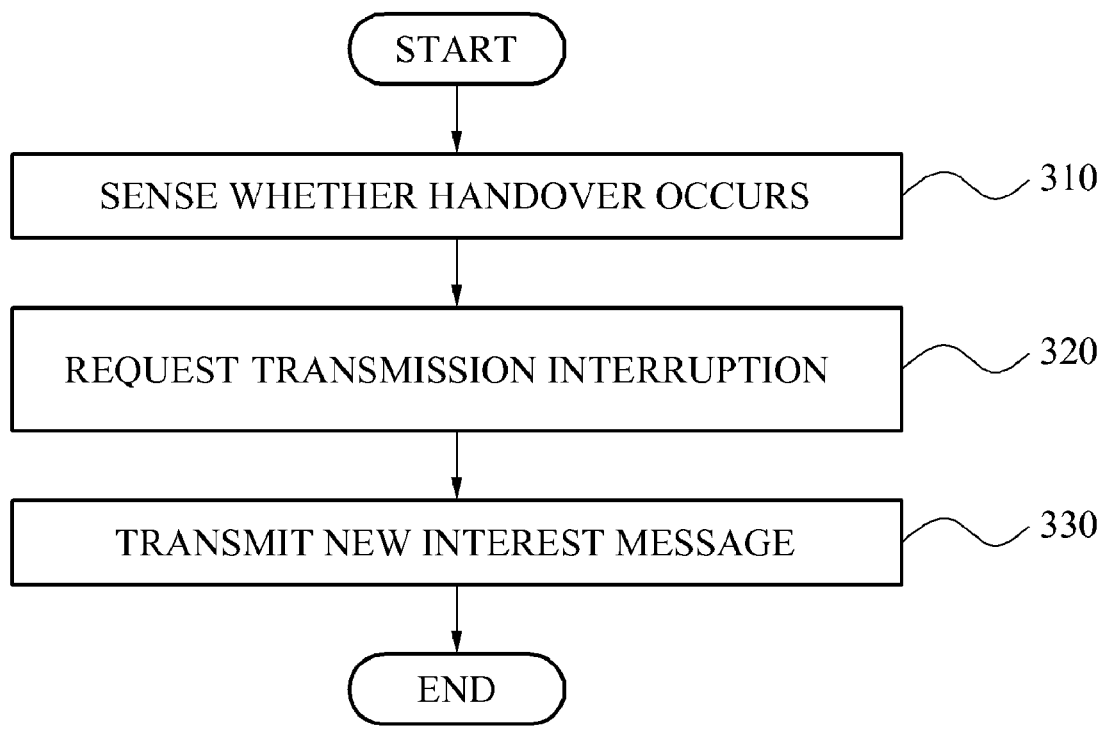
FIG. 3 is a flowchart illustrating an example of a communication method of a terminal in a content centric network.

FIG. 3 illustrates an example of a communication method of a terminal in a content centric network.

Referring to FIG. 3, the method includes sensing whether a handover occurs in 310, requesting a transmission interruption for an interest message before the handover in 320, and transmitting a new interest message in 330.

For example, in 310 the terminal may sense whether a handover occurs in the terminal that requests content due to movement of a terminal, and the like, while the terminal is being provided with a service. Various schemes such as the below scheme may be used for sensing whether a handover occurs by the terminal.

For example, the terminal may sense whether the terminal is moving based on information about an underlying layer of a network interface. In this example, the underlying layer of the network interface may correspond to, for example, a physical layer or a multimedia access control (MAC) layer, and the information about the underlying layer of the network interface may include, for example, a signal strength received by the terminal, and the like.

For example, the terminal that senses whether the terminal is moving may determine whether the handover occurs in the terminal based on a change in an Internet protocol (IP) address or a change in a prefix of a subnet of the terminal based on a router advertisement received according to the move of the terminal.

In 310, the terminal may receive a polling result, and may determine whether the handover occurs in the terminal based on the polling result. For example, the hub may perform the polling of the targeting terminals managed by the hub. For example, the polling may be performed by the hub periodically or aperiodically to sense or trace whether the handover occurs in the terminals managed by the hub. As another example, the terminal may transfer a state notification that indicates a state of the terminal to the hub, and the hub may sense whether the handover occurs using the state notification.

In 320, before the handover, the terminal may request a hub to perform a transmission interruption for an interest message associated with the content to suspend providing a face using a data message associated with the content, when the handover is expected to occur.

In 330, the terminal may transmit, to the hub, a new interest message after the handover associated with the content so that the hub that manages the terminal may provide a face after the handover with the data message associated with the content, when the handover is completed For example, the new interest message may include new location information of the terminal due to the handover. The location may correspond to the face or a port.

Figure 4:
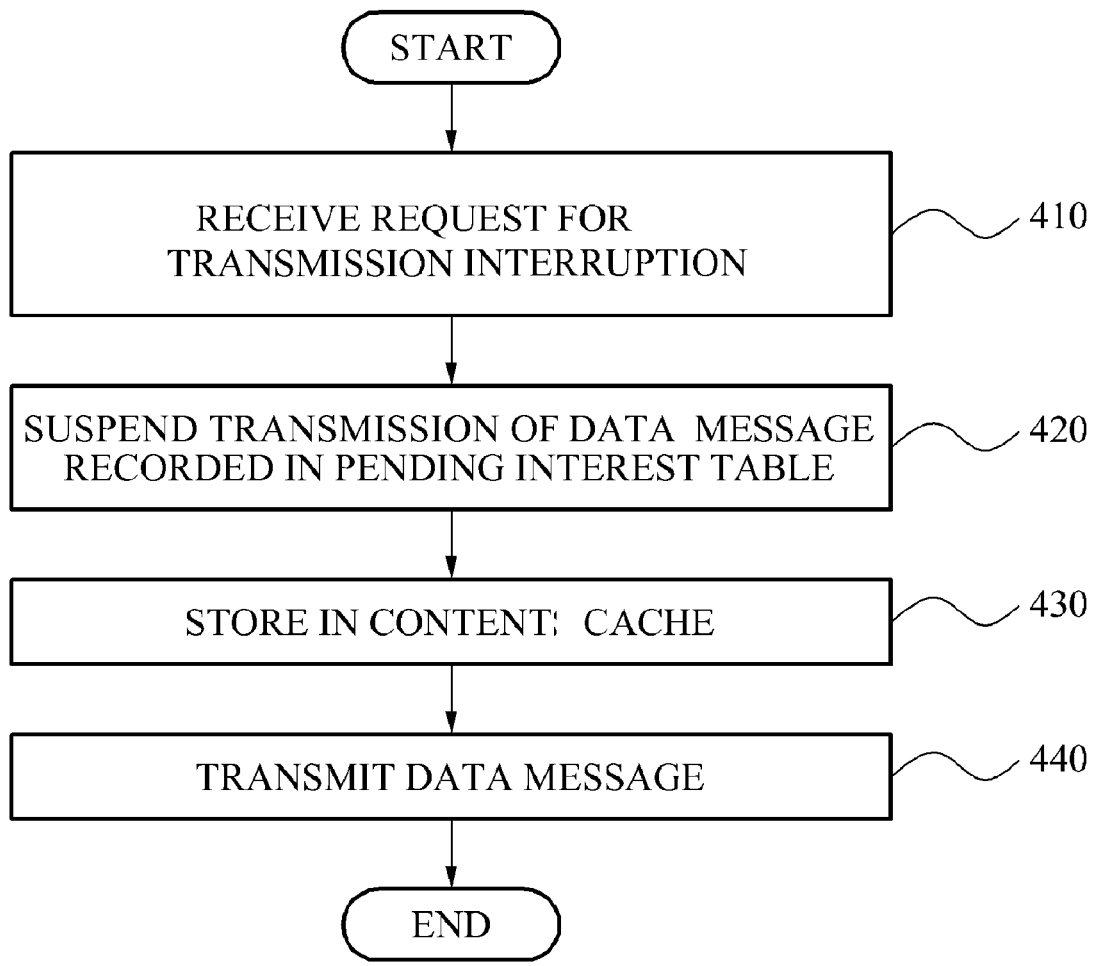
FIG. 4 is a flowchart illustrating an example of a communication method of a hub in a content centric network.

FIG. 4 illustrates an example of a communication method of a hub in a content centric network.

Referring to FIG. 4, the method includes requesting a transmission interruption for an interest message before the handover, in 410, suspending a transmission of a data message recorded in a pending interest table, in 420, storing in a content cache, in 430, and transmitting the data message, in 440.

For example, in 410 the hub may receive, from a terminal, a request for a transmission interruption for an interest message before the handover associated with the content, while the terminal that requests content is provided with a service.

In response to the request, in 420, the hub may suspend a transmission of a data message associated with the content that is recorded in a pending interest table that is used for routing and that provides the terminal with the content, and associated with the interest message received from a face before the handover.

In 430, the hub may store, in a content cache, the data message associated with the content recorded in the pending interest table.

For example, in 420, as illustrated in FIG. 2, the hub may suspend a transmission of a data message associated with content A recorded in a pending interest table 240 used for a routing, and associated with the interest message 205 associated with content A received from a face '0' 210 that corresponds to the face before the handover.

The hub may store, in a content cache 220, the data message associated with content A recorded in the pending interest table 240.

In 440, the hub may transmit, to the terminal, the stored data message associated with the content, using a new interest message after the handover associated with the content received from the terminal, and after the handover is completed. An operation after the handover is described with reference to FIG. 5.

Figure 5:
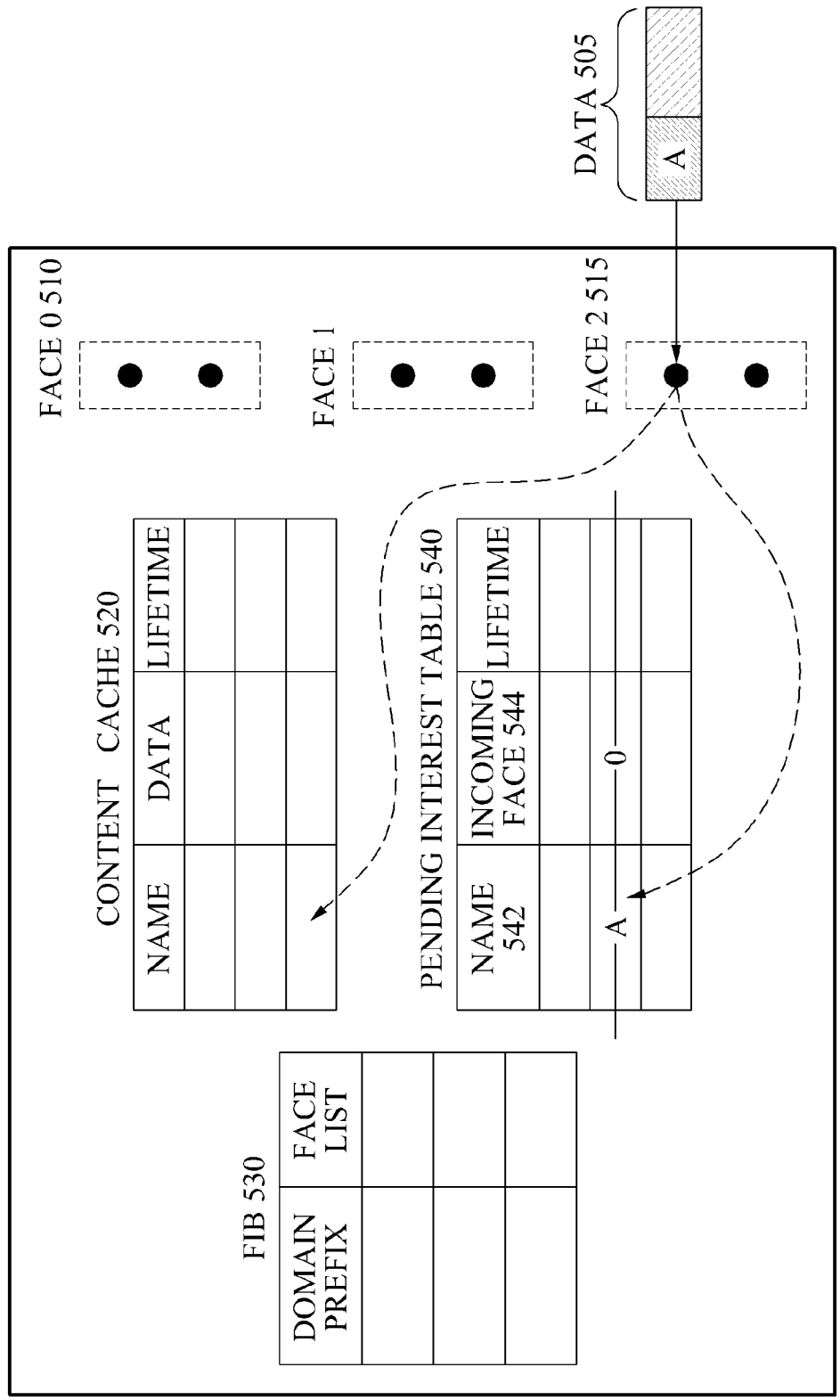
FIG. 5 is a diagram illustrating an example of an operation of a hub after the hub receives a data message in a content centric network.

FIG. 5 illustrates an example of an operation of a hub when the hub receives a data message after a handover in a content centric network.

In the example of FIG. 5, a new interest message is received after the handover associated with the content via a face (2) 515.

Accordingly, after operation 430 shown in FIG. 4, the hub in the content centric network may transmit, to the terminal, the stored data message 505 associated with the content, using the new interest message, after the handover associated with the content received from the terminal, and after the handover is completed.

In this example, the hub may prevent a redundant message from being transmitted to an address before the handover by deleting a value A that is a value of a name field 542 before the handover and a value '0' that is a value of an incoming face field 544 which are values included in a pending list table 540. Also, a malicious approach from an outer source via the face '0' may be prevented.

Figure 6:
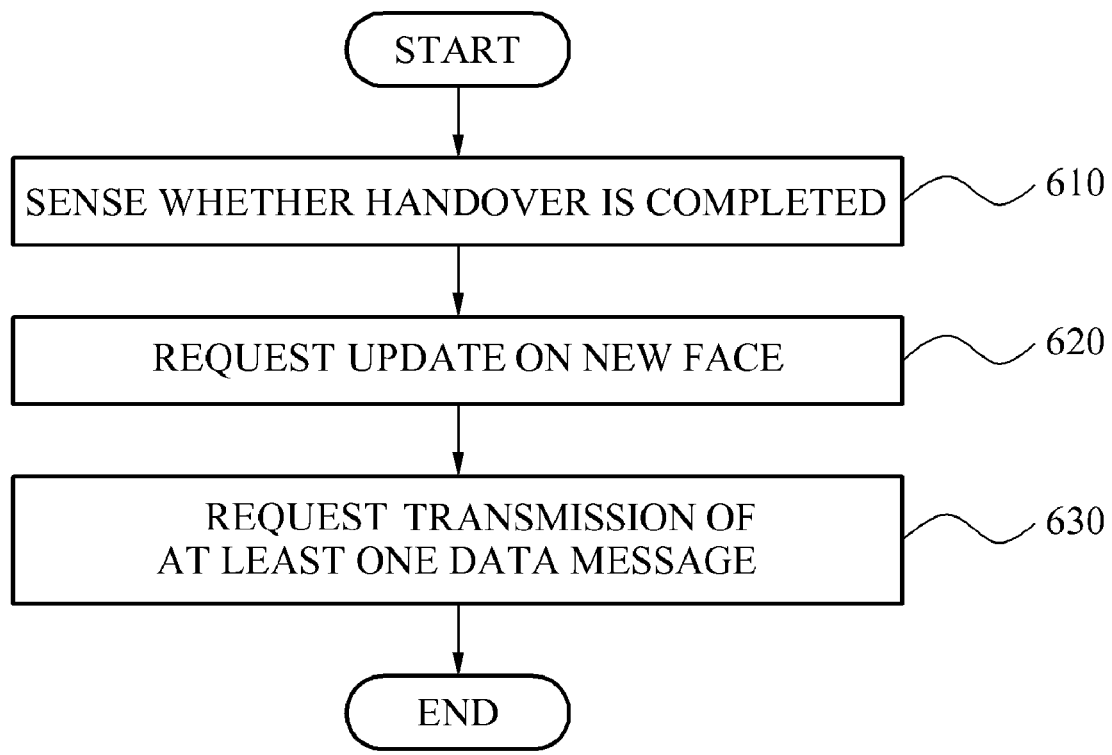
FIG. 6 is a flowchart illustrating another example of a communication method of a terminal in a content centric network.

FIG. 6 illustrates another example of a communication method of a terminal in a content centric network.

Referring to FIG. 6, the method includes sensing whether a handover is completed, in 610, requesting an update on a new face, in 620, and requesting a transmission of at least one data message, in 630.

In 610, the terminal may sense whether the handover is completed while the terminal that requests content is provided with a service.

For example, a scheme for sensing whether the handover is completed in the terminal may be the scheme described in operation 310 of FIG. 3.

In 620, after the handover is completed the terminal may request a hub to perform an update on a new face so that the new face of the hub is provided with at least one data message associated with content transmitted. The transmitted content may be based on an interest message that is transmitted before the handover and that is associated with the content.

In 620, the requesting may further include requesting that information of an incoming face field be modified to a new face after the handover. The incoming face field corresponds to a face that may be provided with at least one data message associated with the content in order to provide the content to the terminal. The incoming face field may be stored in a pending interest table used for routing.

For example, 620 may further include requesting the face before the handover, to transmit at least one data message associated with the content received by the interest message associated with the content to be stored in the hub.

The terminal may request the transmission of the at least one data message associated with the content, by piggy-backing a control message on the hub. For example, the control message may include a sequence information list indicating a sequence of the at least one data message associated with the content.

For example, the at least one data message associated with the content may be a data message that is not received by the terminal after the hub has transferred the at least one data message to the face before the handover.

For example, the sequence information list may include at least one of sequence information of a first data message and sequence information of the last data message. For example, the first data message may be a data message associated with the content that is not received by the terminal, after the hub has transferred the at least one data message to the terminal via the face before the handover.

As an example, the hub may transfer at least one data message that corresponds to data messages 3, 4, 5, and 6 to the terminal via the old face before the handover, however, the terminal may not receive the data messages 3, 4, 5, and 6.

In this example, the terminal may piggyback, on the hub, the control message including the sequence information list including a sequence information 3 of the first data message or a sequence information 6 of the last data message that are not received, among the at least one data message associated with the content.

Also, according to an aspect, the terminal may piggyback, on the hub, the control message including the sequence information list including both of the sequence information 3 of the first data message and the sequence information 6 of the last data message, or the control message including the sequence information list including various combinations of the sequences of the data message that are not received by the terminal. Accordingly, the hub may provide the terminal with data messages 3-6 using the new updated face.

Figure 7:
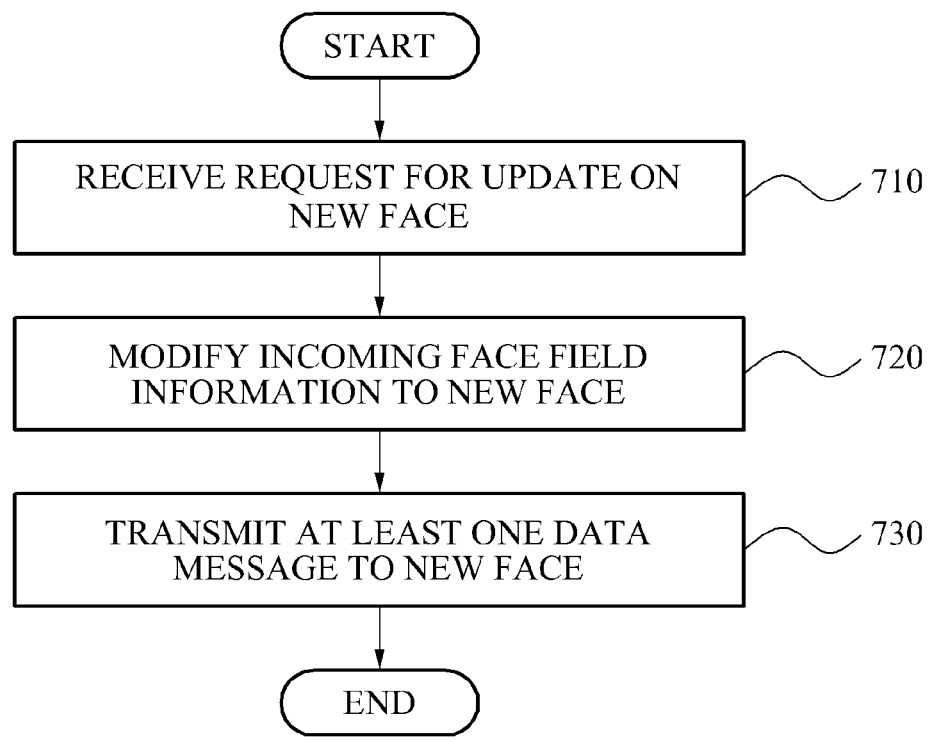
FIG. 7 is a flowchart illustrating another example of a communication method in a hub in a content centric network.

FIG. 7 illustrates another example of a communication method of a hub in a content centric network.

Referring to FIG. 7, the method includes receiving a request for an update on a new face, in 710, modifying incoming face field information to the new face, in 720, and transmitting, to the new face after the handover, at least one data message, in 730.

In 710, the hub may receive, from a terminal, the request for the update on the new face after the handover, after the handover occurring while the terminal that requests the content is being provided with a service is completed. The request for the update is for providing the new face after the handover with at least one data message associated with the content transmitted based on an interest message before the handover associated with the content.

For example, in 710, the hub may receive, from the terminal, a request to update the new face of the hub after the handover. When the new face is updated, the new face of the hub may provide the terminal with at least one data message associated with the content that was previously requested by the terminal before the handover. That is, the new face may provide content that the terminal requested in the interest message that was transmitted to the old face of the hub before the handover.

In 720, the hub may modify incoming face field information to the new face after the handover. The incoming face field indicates a face provided with at least one data message associated with the content. For example, the incoming face field may be stored in a pending interest table used for routing. The incoming face may be used for providing the content to the terminal, based on the new face after the handover provided from the terminal in response to the request.

In 730, the hub may transmit, to the new face that is modified in 720, at least one data message associated with the content.

In 730, for example, the transmitting may further include transmitting, to the terminal via the new face, the at least one data message associated with the content received via the face before the handover to be stored, by the interest message before the handover associated with the content.

Also, to transmit the at least one data message associated with the content to the new face after the handover, the operation may include receiving, from the terminal, the control message including the sequence information list with respect to the at least one data message associated with the content transmitted to the terminal via the face before the handover by the hub, and transmitting, to the new face after the handover, the at least one data message associated with the content, based on the sequence information list.

Figure 8:
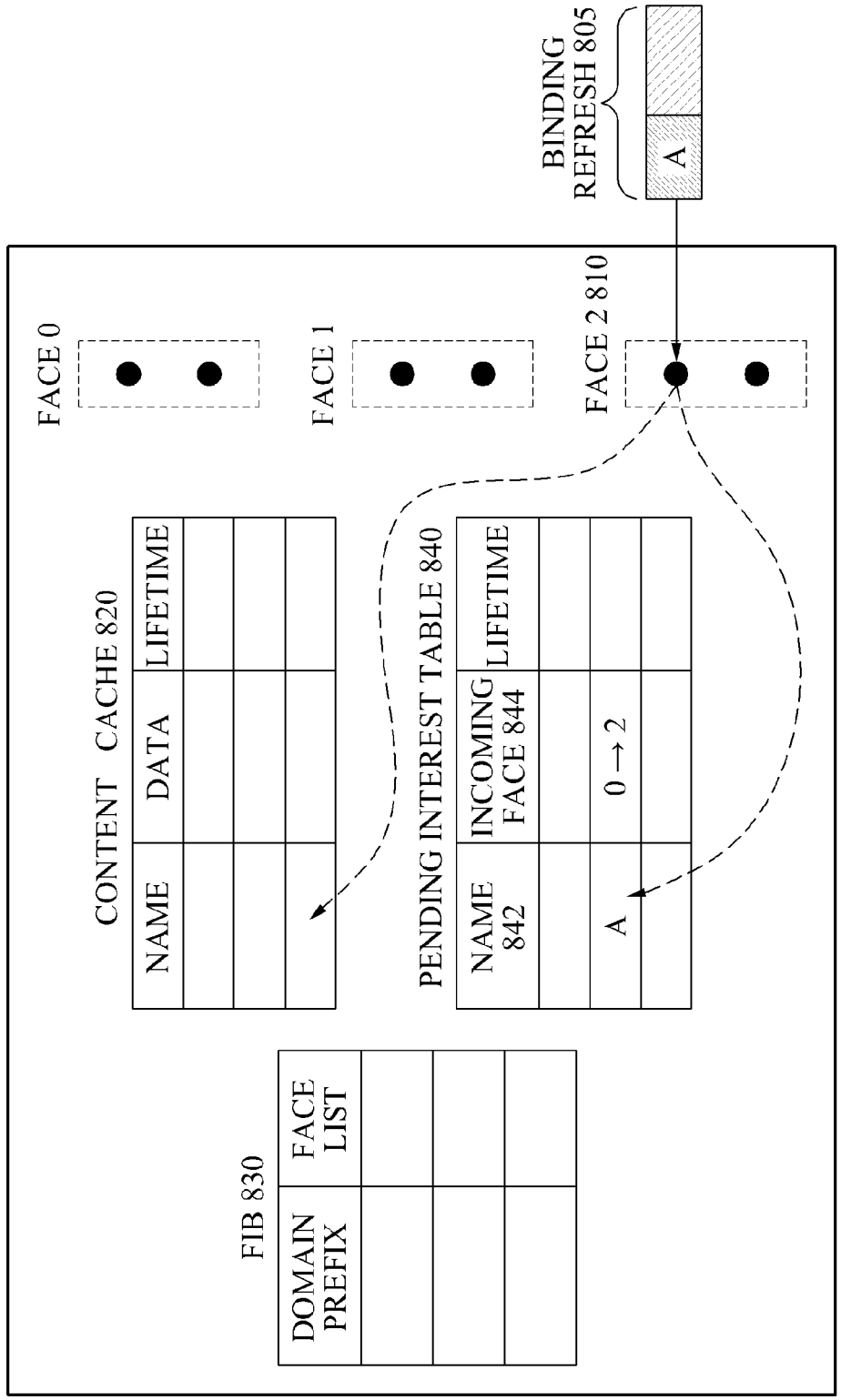
FIG. 8 is a diagram illustrating an example operation of a hub that modifies information of an incoming face field to a new face after a handover in a content centric network.

FIG. 8 illustrates an example operation of a hub that modifies information of an incoming face field to a new face after a handover in a content centric network.

Referring to FIG. 8, the terminal may request the hub to update the information of the incoming face field to the new face after the handover by providing the hub with the new face after the new handover, instead of requesting the hub to perform the transmission interruption before the handover is sensed.

After the handover occurred while the terminal that requests the content is being provided with a service is completed, the terminal may transmit, to the hub, a request for an update on the new face after the handover to provide the new face after the handover with at least one data message associated with the content.

The terminal may request the hub to perform a transmission, to the face before the handover, of the at least one data message associated with the content that is received by an interest message before the handover associated with the content to be stored in the hub.

For example, after the handover is completed, the terminal may transmit, to the hub, a request for an update on the new face so that the new face of the hub may provide the terminal with at least one data message associated with the content that was previously requested by the terminal to the old face which occurred before the handover. That is, before the handover is performed that terminal may request content using an interest message to a first face. After the handover is performed, the terminal may request the face to be updated. Accordingly, a second face may transmit content that was previously requested by the terminal, to the terminal.

For example, as illustrated in FIG. 8, the hub may modify information of an incoming face field 844 from '0' that is a face before the handover to '2' that is a new face after the handover. In this example, a pending list table 840 used for routing for providing the content to the terminal may include the incoming face field 844 which may indicate a face to which at least one data message associated with the content is provided.

Also, the terminal may transmit, to the hub, a control message, for example, a binding refresh message 805 including a sequence information list with respect to the at least one data message associated with the content transmitted to the terminal via the face before the handover by the hub.

In this example, the terminal may request a transmission of the at least one data message associated with the content, by piggybacking, on the hub, the control message including the sequence information list.

The hub may transmit, to the new face after the handover, for example, the face '2', the at least one data message associated with the content A, based on the sequence information list included in the control message 805.

Figure 9:
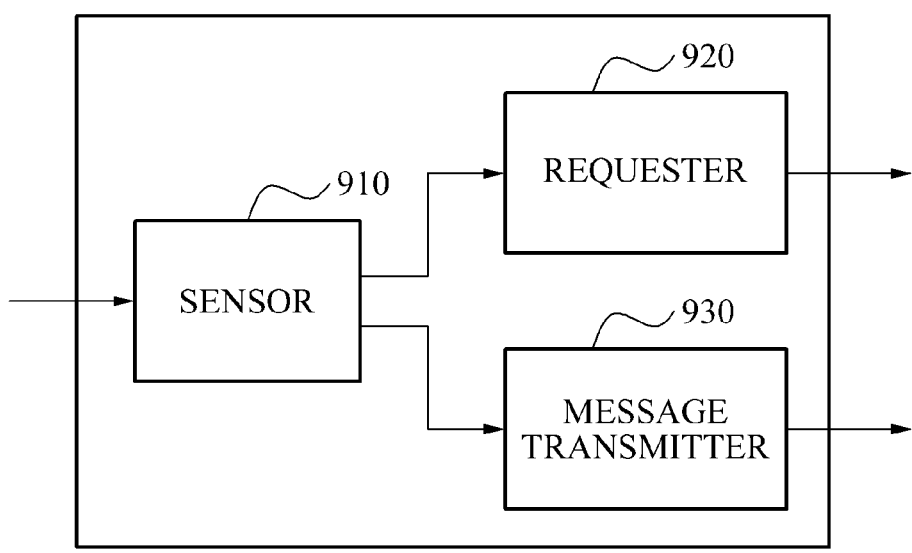
FIG. 9 is a diagram illustrating an example of a terminal for a content centric network.

FIG. 9 illustrates an example of a terminal for a content centric network.

Referring to FIG. 9, the terminal 900 includes a sensor 910, a requester 920, and a message transmitter 930.

The sensor 910 may sense whether a handover occurs or whether a handover is about to occur in the terminal 900 that requests content while the terminal 900 is provided with a service. The sensor 910 may also sense when the handover is completed.

The requester 920 may request a hub to perform a transmission interruption for an interest message before the handover associated with the content when the handover is expected to occur in the terminal 900.

The requesting is for suspending the face from providing a data message associated with the content, by the hub.

The message transmitter 930 may transmit, to the hub, the new interest message after the handover associated with the content so that the hub may provide the face after the handover with the data message associated with the content, when the handover in the terminal 900 is completed.

Figure 10:
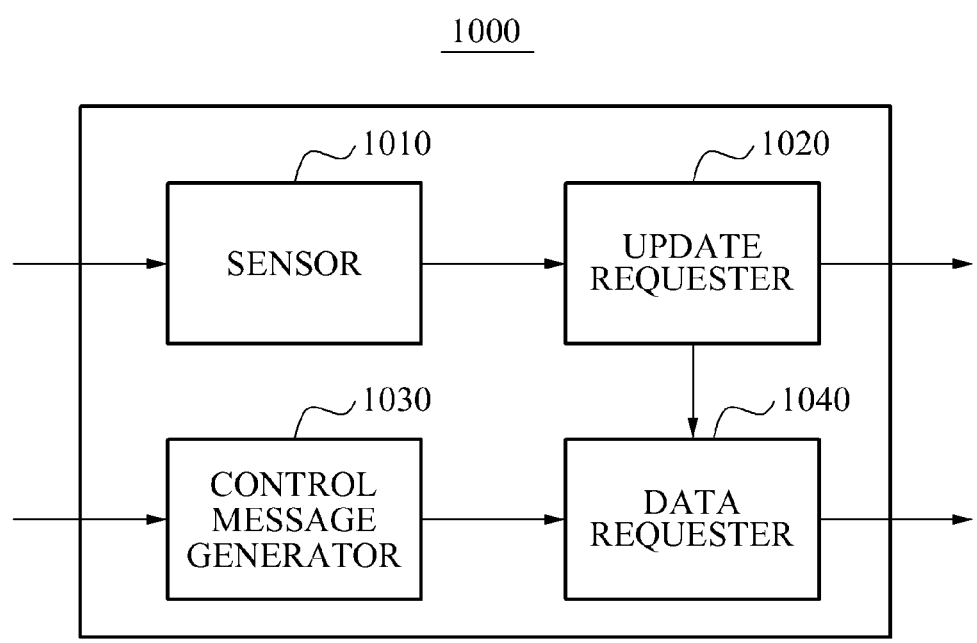
FIG. 10 is a diagram illustrating another example of a terminal for a content centric network.

FIG. 10 illustrates another example of a terminal for a content centric network.

Referring to FIG. 10, the terminal 1000 includes a sensor 1010, an update requester 1020, a control message generator 1030, and a data requester 1040.

The sensor 1010 may sense whether a handover is completed. The handover may occur while the terminal 1000 that requests content is provided with a service. The sensor 1010 may also sense when a handover is occurring or when a handover is about to occur.

The update requester 1020 may request a hub to perform an update on a new face after the handover so that the new face of the hub after the handover may be provided with at least one data message associated with the content based on an interest message that was transmitted before the handover associated with the content, after the handover is completed.

The control message generator 1030 may generate a control message including a sequence information list that indicates a sequence of at least one data message associated with the content that is not received by the terminal 1000.

The data requester 1040 may request a transmission of the at least one data message associated with the content to the new face after the handover, by piggybacking, on the hub, the control message generated in the control message generator 1030.

Features of a method of communication for a terminal and a hub in a content centric network that are described above with reference to FIG. 1 to FIG. 8 may be applied to a terminal for the content centric network described with reference to FIG. 9 and FIG. 10. The features that apply to the terminal may include features omitted in the examples described with reference to FIG. 9 and FIG. 10. That is, it should be appreciated, that one or more of the sensor 910, the requester 920, and the message transmitter 930 may also be included in the terminal 1000 that is described with reference to FIG. 10. It should also be appreciated, that one or more of the sensor 1010, the update requester 1020, the control message generator 1030, and the data requester 1040 may also be included in the terminal 900 that is described with reference to FIG. 9.

While not shown in FIGS. 9 and 10, it should be appreciated that the terminals 900 and/or 1000 may also include, for example, a receiver, a transmitter, a transceiver, and the like.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a terminal in a content-centric network, the method comprising:
   sensing whether a handover occurs in the terminal that requests a content while the terminal is provided with a service;
   requesting a hub to perform a transmission interruption of the content associated with an interest message before the handover, to suspend providing a face before the handover with a data message associated with the content, in response to the handover being expected to occur; and
   transmitting, to the hub, a new interest message after the handover associated with the content so that the hub provides a face after the handover with the data message associated with the content, in response to the handover being completed.

2. The method of claim 1, wherein the sensing comprises:
   sensing whether the terminal is moving based on information about an underlying layer of a network interface; and
   determining whether the handover occurs in the terminal based on a change in an Internet protocol (IP) address of the terminal or a change in a prefix of a subnet of the terminal according to the move of the terminal.

3. The method of claim 1, wherein the sensing comprises:
   receiving a polling result performed by the hub to sense whether the handover occurs in the terminal; and
   determining whether the handover occurs based on the polling result.

4. The method of claim 1, wherein the new interest message comprises new location information of the terminal as a result of the handover.

5. A method of communication for a hub in a content-centric network, the method comprising:
   receiving, from a terminal, a request for a transmission interruption of a content associated with an interest message before the handover, when a handover occurs while the terminal that requests a content is provided with a service;
   suspending, according to the request, a transmission of a data message associated with the content recorded in a pending interest table that is used for routing, and associated with the interest message received from a face before the handover;
   storing, in a content cache, the data message associated with the content recorded in the pending interest table; and
   transmitting, to the terminal, the stored data message associated with the content, using a new interest message after the handover associated with the content received from the terminal, after the handover is completed.

6. A method of communication for a terminal in a content-centric network, the method comprising:
   sensing whether a handover is completed, wherein the handover occurs while the terminal that requests content is provided with a service; and requesting a hub to update a transmitting face of the hub from a first face to a second face in response to the handover being completed, so that after the handover is complete, the second face is provided with at least one data message associated with the content transmitted based on an interest message that is transmitted before the handover and that is associated with the content, wherein the requesting comprises requesting that information of an incoming face field be modified to the second face after the handover, and the incoming face field indicates a face provided with the at least one data message among fields of a pending interest table used for routing in response to the incoming face field being modified to the second face after the handover.

7. The method of claim 6, wherein the requesting further comprises requesting a transmission of the at least one data message that the hub receives by the interest message before the handover and stores.

8. The method of claim 7, wherein the requesting the transmission comprises transmitting, to the hub, a control message comprising a sequence information list indicating a sequence of the at least one data message that the terminal fails to receive, after the hub has transferred the at least one data message to the first face.

9. The method of claim 8, wherein the sequence information list comprises at least one of sequence information of a first data message and sequence information of the last data message, among at least one data message associated with the content that the terminal fails to receive, after the hub has transferred the at least one data message to the terminal via the first face.

10. The method of claim 6, wherein the transmitting comprises transmitting the at least one data message to the second face based on the sequence information list.

11. A method of communication for a hub in a content-centric network, the method comprising:
receiving, from a terminal, a request to update a transmitting face and modify information of an incoming face field, after the handover is completed, the terminal requesting the hub to update the transmitting face in response to the handover being completed;
updating the transmitting face from a first face to a second face in response to the request from the terminal after the handover being completed, to provide the second face with at least one data message associated with the content transmitted based on an interest message that is transmitted before the handover and that is associated with the content;
modifying the information of the incoming face field to the second face in response to the request from the terminal after the handover being completed, the incoming face field indicates a face provided with the at least one data message among fields of a pending interest table used for a routing; and
transmitting the at least one data message via the second face to the terminal.

12. The method of claim 11, wherein the transmitting further comprises:
transmitting, to the terminal via the second face, the at least one data message received via the first face and stored.

13. The method of claim 11, further comprising:
receiving, from the terminal, a control message comprising a sequence information list with respect to the at least one data message transmitted to the terminal via the first face before the handover occurs, and transmitting, to the second face after the handover occurs, the at least one data message, based on the sequence information list, wherein the sequence information list comprises at least one of sequence information of a first data message and sequence information of a last data message.

14. A non-transitory computer-readable storage medium having stored therein program instructions to cause a processor to implement a communication method of a terminal in a content-centric network, the method comprising:
sensing whether a handover occurs in the terminal that requests a content while the terminal is provided with a service;
requesting a hub to perform a transmission interruption using an interest message before the handover associated with the content to suspend providing a face before the handover with a data message associated with the content, in response to the handover being expected to occur; and
transmitting, to the hub, a new interest message after the handover associated with the content so that the hub provides a face after the handover with the data message associated with the content, in response to the handover being completed.

15. A terminal for a content-centric network, the terminal comprising:
a sensor configured to sense whether a handover occurs in the terminal that requests a content while the terminal is being provided with a service;
a requester configured to request a hub to perform a transmission interruption for an interest message before the handover associated with the content to suspend providing a face before the handover with a data message associated with the content, in response to the handover being expected to occur; and
a message transmitter configured to transmit, to the hub, a new interest message after the handover associated with the content so that the hub provides a face after the handover with the data message associated with the content, in response to the handover being completed.

16. A terminal for a content-centric network, the terminal comprising:
a sensor configured to sense whether a handover is completed, the handover occurring while the terminal that requests a content is being provided with a service;
an update requester configured to request a hub to update a transmitting face from a first face to a second face after the handover so that the second face is provided with at least one data message associated with the content transmitted based on an interest message before the handover, after the handover is completed; and
a data requester configured to request a transmission of the at least one data message to the second face using a control message transmitted to the hub, wherein the control message comprises a sequence information list indicating a sequence of the at least one data message that the terminal fails to receive, after the hub has transferred the at least one data message to the first face.

17. A terminal in a content centric network that requests content from a hub, the terminal comprising:
a receiver configured to receive one or more data messages associated with the content from a first face of a hub, the content being requested by the terminal;
a sensor configured to sense whether a handover occurs in the terminal while the terminal is provided with a service;

a requester configured to request the hub to perform a transmission interruption of the content associated with an interest message before the handover, to suspend providing the first face before the handover with one or more data messages associated with the content, in response to the handover being expected to occur; and a message transmitter configured to transmit, to the hub, a new interest message after the handover associated with the content indicating so that the hub provides a face after the handover with the one or more data messages associated with the content, in response to the handover being completed.

18. The terminal of claim 17, further comprising an update requester configured to transmit a request to the hub to update a transmitting face from the first face to the second face.

19. The terminal of claim 17, further comprising:

a control message generator configured to generate a control message that comprises a sequence list of one or more data messages of the content that were not successfully received by the terminal, wherein the sequence list comprises at least one of sequence information of a first data message and sequence information of a last data message; and a data requester configured to transmit the control message to the second face of the hub to inform the hub of the data messages that were not successfully received, wherein, after the terminal transmits the new interest message, and after the handover is completed, the receiver receives remaining data messages associated with the content from a second face of the hub, and wherein the content is recorded in a pending interest table that is used for routing using the first interface.

* * * * *